Figure 1:
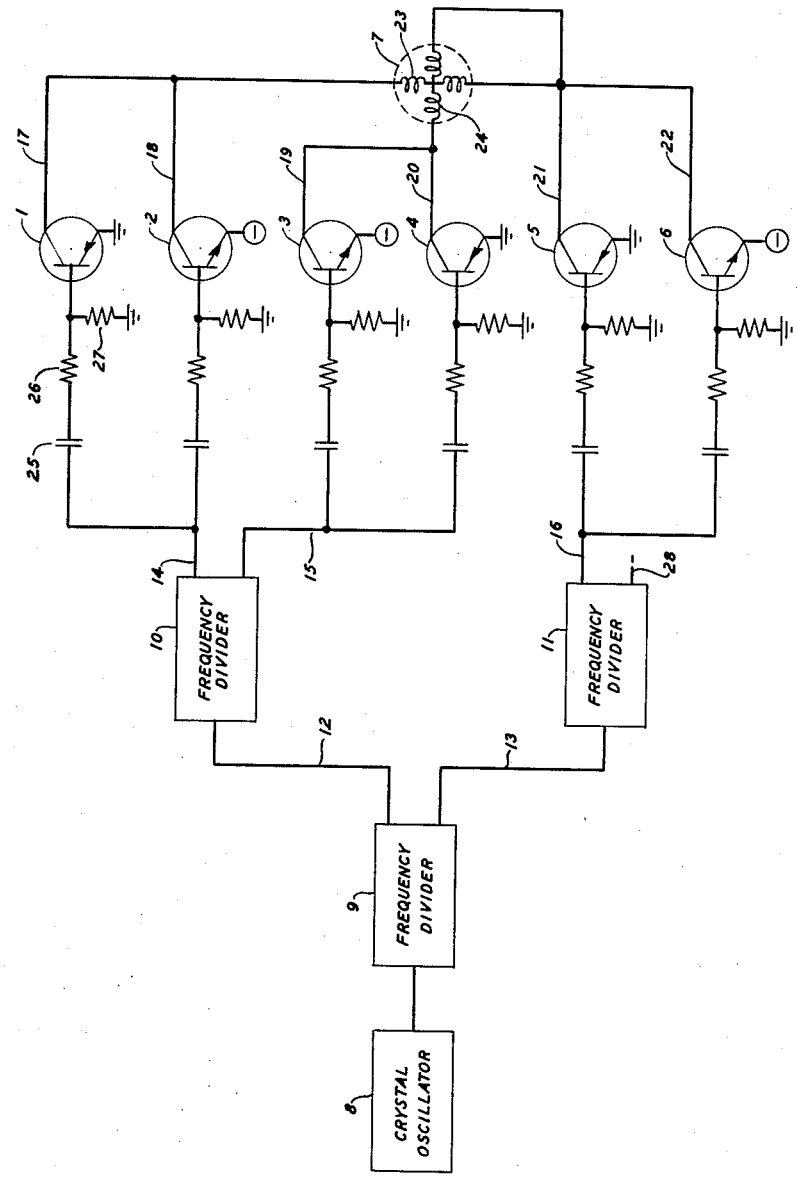

Nov. 14, 1961 R. W. COLLINS 3,009,089
POWER SUPPLY SYSTEM
Filed May 25, 1960 2 Sheets-Sheet 1

INVENTOR
R. W. COLLINS
BY
ATTORNEY

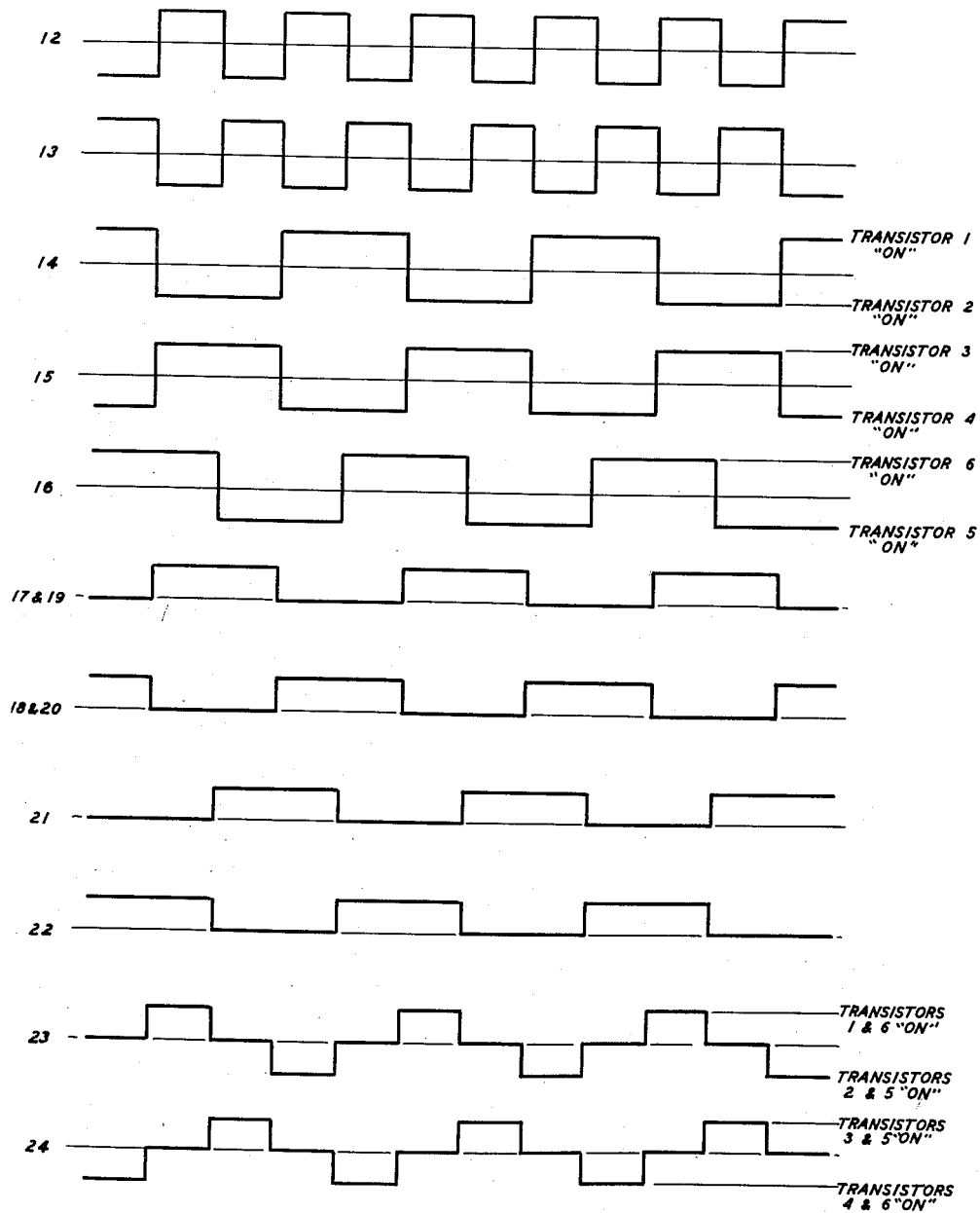

United States Patent Office 3,009,089
Patented Nov. 14, 1961

3,009,089
POWER SUPPLY SYSTEM
Russell W. Collins, Baldwin, N.Y., assignor to Bell Telephone Laboratories, Incorporated, New York, N.Y., a corporation of New York
Filed May 25, 1960, Ser. No. 31,597
9 Claims. (Cl. 318—329)

This invention relates to power supply systems and more particularly to accurately divided phase splitter power supplies.

A conventional two-phase synchronous motor comprises two stator or stationary (field) windings, and armature or rotor windings. In pulse applications, it is necessary to provide current pulses with a phase displacement of 90 degrees, one at a time, to each full winding of the stator in order to produce a "rotating" magnetic field around the stationary stator windings. The rotor or armature of the motor is propelled by the magnetic field thus obtained and a motor action is achieved. The smoothness of rotation and amount of torque obtained depend upon the strength and uniformity of the "rotating" magnetic field, hence the phase displacement and magnitude of the pulses provided to the stator windings is critical in determining motor performance.

The necessary phase displacement and pulse magnitude have been obtained by using center-tapped motor stator windings in combination with transistors operating in the push-pull mode of operation. A total of four transistors are used, two in combination with each stator winding. Since only half of the stator windings are used at any one time, it is impossible to obtain sufficient torque for smooth operation when this method was used at lower speeds, e.g., 450 revolutions per minute. To obtain sufficient power output at lower speeds, it is necessary to supply power to the full stator winding. This has been accomplished by using the push-pull transistor arrangement referred to above, substituting a transformer with a center-tapped primary winding for the stator winding, and connecting the secondary winding of the transformer to the full stator winding. This configuration, which eliminates the stator winding center-tap, requires two transformers in addition to the four transistors.

It is an object of this invention to provide a lightweight, reliable, transformer-less pulse power supply.

A further object of this invention is to provide an accurately divided phase splitter power supply.

A further object of this invention is to provide a two-phase synchronous motor power supply to obtain optimum motor torque and smoothness of operation.

It has been found that these objectives may be achieved by employing transistor complementary symmetry networks in combination with a crystal oscillator and flip-flop frequency dividers to provide power to the full stator windings of a synchronous motor.

Other objects and features of the present invention will become apparent upon consideration of the following detailed description when taken in connection with the accompanying drawings, in which:

FIG. 1 is a schematic representation of an electrical circuit comprising an embodiment of the invention; and FIG. 2 shows some waveforms produced by the system of FIG. 1.

Referring now to FIG. 1 of the drawing there is provided a crystal oscillator 8 and flip-flop or similar frequency dividers 9, 10 and 11. The stable output frequency of the crystal oscillator 8 is divided into two output frequencies 12 and 13, as shown on FIG. 2, by frequency divider 9. The output waveforms 12 and 13 are 180 degrees apart in phase at a frequency which is half the frequency output of the crystal oscillator 8. The output 12 is used to "trigger" the flip-flop frequency divider 10, yielding two outputs 14 and 15, displaced 180 degrees apart in phase and at a frequency one-quarter the frequency output of the crystal oscillator 8. The output 13 is used to "trigger" the flip-flop frequency divider 11, thus obtaining two outputs 16 and 28, also displaced 180 degrees apart in phase and at a frequency one-quarter the frequency output of the crystal oscillator 8. It should be noted that the outputs (14 and 16) and (15 and 28) are only 90 degrees apart in phase and are all of the same frequency.

Each of the outputs 14, 15 and 16 is fed into a "two-transistor" network comprising transistors 1 and 2, 3 and 4, and 5 and 6, respectively. Each network comprises a p-n-p transistor (1, 4 and 5) and a n-p-n transistor (2, 3 and 6) connected in accordance with the principle of complementary symmetry, i.e., for positive signal current in the base of the n-p-n transistor the collector current increases, while for positive signal current in the base of a p-n-p transistor the collector current decreases and vice-versa for negative signal currents. The output 28 of the frequency divider 11 is not used. The outputs of the transistors 1 to 6, connected in groups of two, as described, are serially connected to the two stator windings 23 and 24 of motor 7 as follows: 1 and 2 and 5 and 6 to winding 23 and 3 and 4 and 5 and 6 to winding 24. As shown in FIG. 2, current will flow through the winding 23 at 90 degree intervals in one direction when both transistors 1 and 6 are conducting and in the opposite direction when both transistors 2 and 5 are conducting. Current will flow through the winding 24 at 90 degree intervals alternate to the current flow in winding 23, in one direction when both transistors 3 and 5 are conducting and in the opposite direction when both transistors 4 and 6 are conducting. These are the only combinations which will result in current flow in either winding. An exact "rotating" magnetic field is thus established by the pulse current flow through the full-motor stator windings thereby obtaining the operational advantages previously discussed.

Capacitor 25 and resistors 26 and 27 form a conventional coupling and base biasing network for transistor 1. Each of the transistors has a similar network.

Since changes may be made in the above-described arrangement, and different embodiments may be devised by those skilled in the art without departing from the spirit and scope of the invention, it is to be understood that matter contained in the foregoing description and accompanying drawings is illustrative of the application of the principles of the invention, and is not to be construed in a limiting sense.

What is claimed is:

1. In a power supply, means for producing a series of pulses, first, second and third bistable means, said first bistable means producing in response to said series of pulses two output voltages each having two magnitudes occurring alternately for substantially equal intervals of time, said second bistable means being responsive to one of said output voltages, said third bistable means being responsive to the other of said output voltages, said second bistable means producing two output voltages each having two magnitudes occurring alternately for substantially equal intervals of time, said third bistable means producing an output voltage having two magnitudes occurring alternately for substantially equal intervals of time, the intervals of time of the magnitudes of each of the output voltages of said first bistable means being equal to half the interval of time of the magnitudes of the output voltages of each of said second and third bistable means, first, second and third transistor networks comprising n-p-n and p-n-p transistors connected in complementary symmetry, said first transistor network being responsive to one output voltage of said second bistable means, said second transistor network being responsive to the other output voltage of said second bistable means, said third transistor network being responsive to the output voltage of said third bistable means, whereby said second and third bistable means render said n-p-n and p-n-p transistor networks in each of said complementary symmetry networks alternately conducting.

2. A power supply in accordance with claim 1 wherein said bistable means comprise transistor flip-flop circuits.

3. A power supply in accordance with claim 1 wherein said means for producing a series of pulses generates said pulses at a constant frequency.

4. A two-phase power supply comprising means for producing a series of pulses, first, second and third bistable means, said first bistable means producing in response to said series of pulses two output voltages each having two magnitudes occurring alternately for substantially equal intervals of time, said second bistable means being responsive to one of said output voltages, said third bistable means being responsive to the other of said output voltages, each of said second and third bistable means producing two output voltages having two magnitudes occurring alternately for substantially equal intervals of time, the intervals of time of the magnitudes of the output voltages of said first bistable means being equal to half the interval of time of the magnitudes of each of the output voltages of said second and third bistable means, first second and third transistor amplifier networks each comprising n-p-n and p-n-p transistors, each of said n-p-n and p-n-p transistors having base, collector, and emitter terminals, means for connecting said n-p-n and p-n-p transsistors in complementary symmetry, means for connecting said n-p-n base terminal to said p-n-p base terminal in each of said first, second, and third complementary symmetry networks, means for connecting each of said two outputs of said second bistable means to each of said common base terminals of said first and second complementary symmetry networks, means for connecting one of said two outputs of said third bistable means to said common base terminal of said third complementary symmetry network, means for connecting said collector terminals of said n-p-n and p-n-p transistors in each of said first, second and third complementary symmetry networks, first and second impedance means, means for serially connecting said first impedance means to said common collector connections of said first and third complementary symmetry networks, means for connecting said second impedance means to said common collector connections of said second and third complementary symmetry networks, said second and third bistable means rendering said n-p-n and p-n-p transistors in each of said complementary symmetry networks alternately conducting thereby producing current pulses of opposite polarity and equal value, said pulses having a duration of one-quarter cycle and occuring at one-quarter cycle intervals in each of said first and second impedance means, the pulses in said second impedance means being displaced one-quarter cycle from the pulses in said first impedance means.

5. A two-phase power supply in accordance with claim 4 wherein said bistable means comprise transistor flip-flop circuits.

6. A two-phase power supply in accordance with claim 4 wherein said means for producing a series of pulses generates said pulses at a constant frequency.

7. A two-phase power supply in accordance with claim 4 wherein said first and second impedance means are first and second stator windings of a two-phase motor.

8. In a power supply, means for producing a series of pulses, first, second and third bistable means, said first bistable means producing in response to said series of pulses two output voltages each having two magnitudes occurring alternately for substantially equal intervals of time, said second bistable means being responsive to one of said output voltages, said third bistable means being responsive to the other of said output voltages, said second bistable means producing two output voltages each having two magnitudes occurring alternately for substantially equal intervals of time, said third bistable means producing an output voltage having two magnitudes occurring alternately for substantially equal intervals of time, the intervals of time of the magnitudes of each of the output voltages of said first bistable means being equal to half the interval of time of the magnitudes of the output voltages of each of said second and third bistable means, first and second impedance means, means for simultaneously energizing for equal intervals in sequence one of said first pair of switching means; and one of said third pair of switching means; one of said second pair of switching means and the other of said pair of third switching means; the other of said first pair of switching means and the said other of the third pair of switching means; the other of said pair of second switching means and said one of the third switching means, thereby producing quarter-cycle pulses in one direction and then the opposite direction in said first impedance means and quarter-cycle pulses at alternate intervals in one direction and then the opposite direction in said second impedance means.

9. A power supply in accordance with claim 8 wherein said first and second impedance means are first and second stator windings of a two-phase motor.

No references cited.